United States Patent [19]

Karbowski

[11] 4,249,128
[45] Feb. 3, 1981

[54] WIDE PULSE GATED METAL DETECTOR WITH IMPROVED NOISE REJECTION

[75] Inventor: James P. Karbowski, Philomath, Oreg.

[73] Assignee: White's Electronics, Inc., Sweet Home, Oreg.

[21] Appl. No.: 875,677

[22] Filed: Feb. 6, 1978

[51] Int. Cl.$^3$ .............................................. G01V 3/11
[52] U.S. Cl. .................................... 324/329; 328/165
[58] Field of Search .................... 324/3, 6, 233, 239, 324/329; 328/165, 166, 151; 325/371, 377, 473, 476

[56] References Cited

U.S. PATENT DOCUMENTS

| | | | |
|---|---|---|---|
| 3,337,796 | 8/1967 | Hentschel et al. | 324/233 |
| 3,391,336 | 7/1968 | Hentschel | 324/233 |
| 3,471,772 | 10/1969 | Smith | 324/329 |
| 3,737,768 | 6/1973 | Lazenby et al. | 324/3 |
| 3,852,663 | 12/1974 | Brooks et al. | 324/233 |
| 4,030,026 | 6/1977 | Payne | 324/3 |

FOREIGN PATENT DOCUMENTS 1315684  5/1973  United Kingdom ........................ 324/3

OTHER PUBLICATIONS

McGraw-Hill Encyclopedia of Science and Technology, vol. 12, copyright 1977, pp. 21, 22.

*Primary Examiner*—Gerard R. Strecker
*Attorney, Agent, or Firm*—Klarquist, Sparkman, Campbell, Leigh, Hall & Whinston

[57] ABSTRACT

A transmit-receive type buried metal detector is described employing wide gating pulses to transmit a portion of the received signal through a gate means to an averaging means for reducing any noise in the signal. The gating pulses are centered on the received signal waveform at a centering position where a background signal component of such received signal is of minimum amplitude. As a result, equal positive and negative polarity portions of the background signal component are transmitted through the gate means during each pulse and are averaged to zero in order to eliminate such background signal from the output voltage of the averaging means. The background signal component may be produced by mineralized soil or by undesired metal objects located near the metal object sought to be detected. As a result, the mineral soil signal component or the background signal component of the undesired metal objects is eliminated from the output voltage of the averaging capacitor. This enables detection of the desired metal object in mineral soil or enables such desired metal object to be discriminated from undesired objects. A wide gating pulse greater than about ⅓ cycle and preferably equal to approximately ½ cycle of the oscillator signal, is used for improved noise rejection including random noise of high frequency and harmonics of 60 hertz power line frequency which are close to harmonics of the oscillator signal.

18 Claims, 3 Drawing Figures

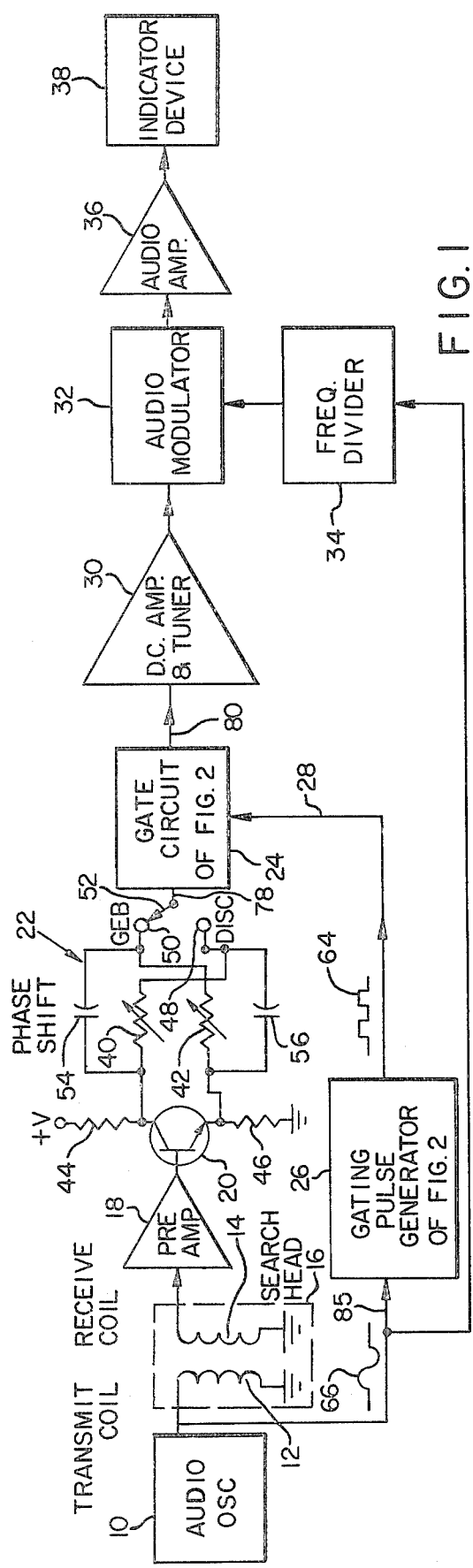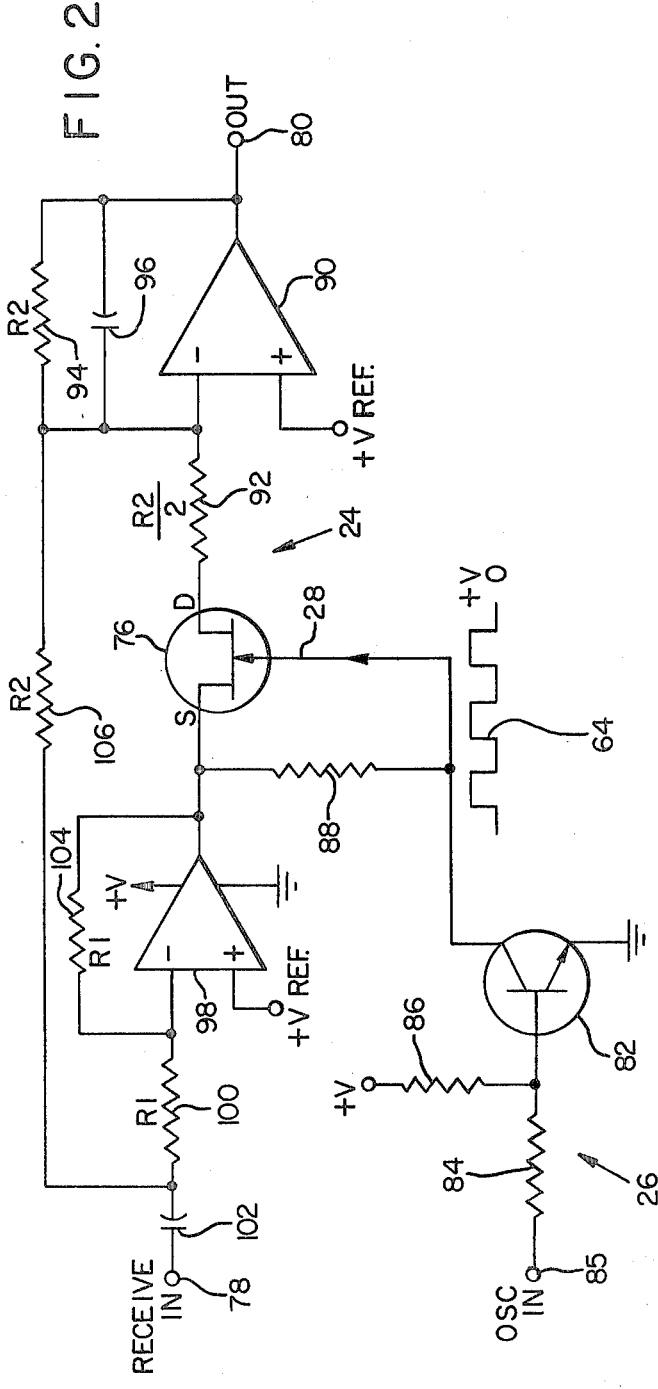
FIG. 1
FIG. 2

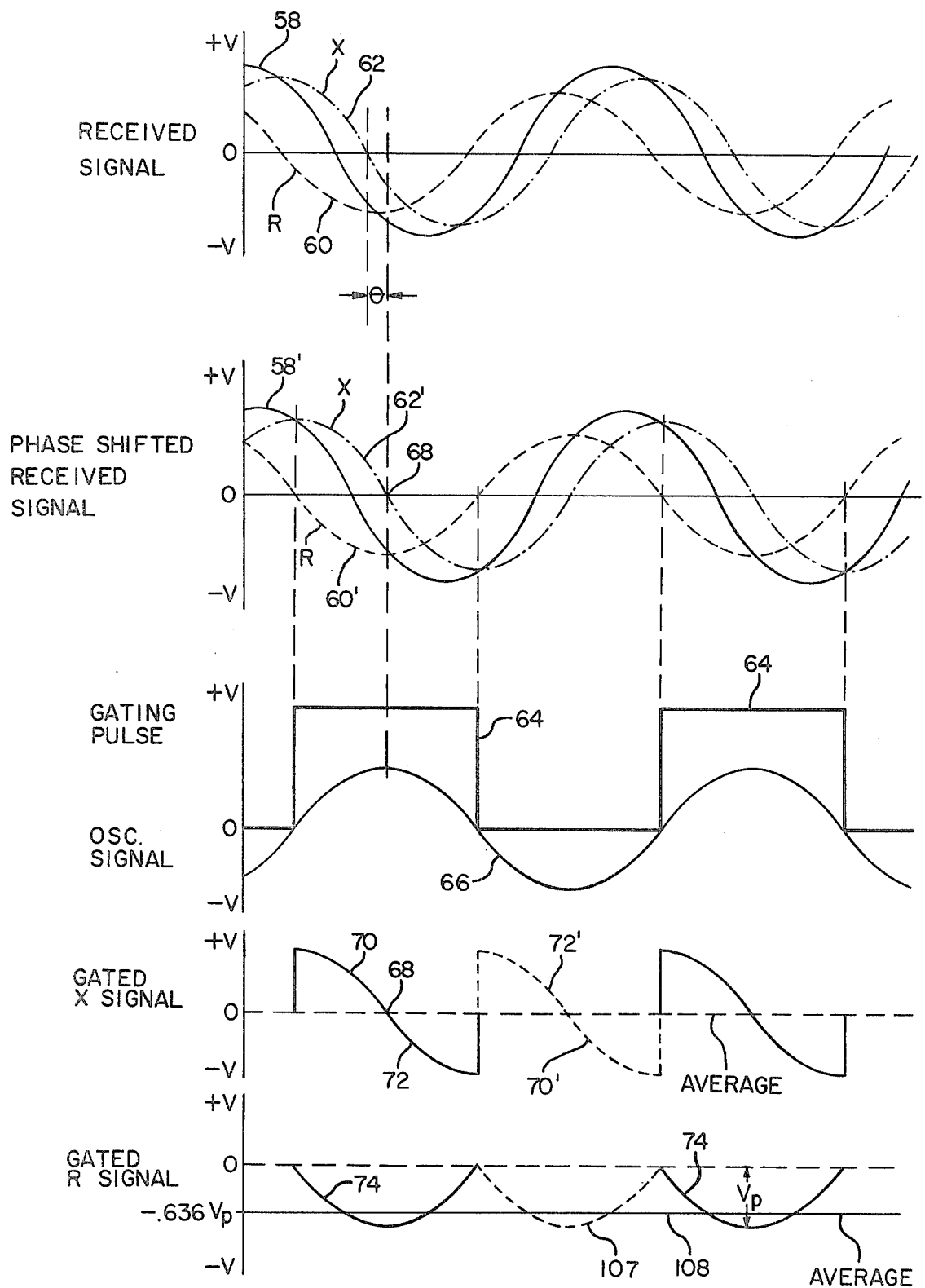

1

WIDE PULSE GATED METAL DETECTOR WITH IMPROVED NOISE REJECTION

BACKGROUND OF THE INVENTION

The subject matter of the present invention relates generally to metal detectors of the transmit-receive type which can be employed to detect buried metal objects in the presence of mineral soil or undesired objects. The present invention is an improvement on the sampling metal detector shown in U.S. Pat. No. 4,030,026 of George C. Payne granted June 14, 1977.

By employing a wide gating pulse having a pulse width greater than about $\frac{1}{3}$ cycle and preferably about $\frac{1}{2}$ cycle of the oscillator signal applied to the transmit coil, the present detector is provided with improved noise rejection. In addition, the present metal detector is provided with greater sensitivity and signal-to-noise ratio than such prior metal detector by employing balanced demodulation whereby both halves of one cycle of the received signal are averaged to produce the output voltage of the gating circuit corresponding to the detected metal object.

The above-identified patent discloses a sampling metal detector which eliminates the mineral soil signal component of the received signal by sampling such received signal when such mineral soil signal component is zero or of minimum amplitude. This minimum amplitude portion of the mineral soil signal component corresponds to when the reactive component of the received signal crosses the zero axis of such received signal. While in most cases this sampling technique is entirely satisfactory and enables the detection of a metal object in the presence of mineral soil, it is possible that in some cases inaccuracies may result due to the presence of noise signal components such as random high frequency noise or 60 cycle harmonics near the second and third harmonics of the oscillator signal occurring in the received signal at the portion which is gated by the sampling pulse.

It has been found that this noise problem can be avoided by using a wide sampling pulse having a width greater than about $\frac{1}{3}$ cycle and preferably $\frac{1}{2}$ cycle of the oscillator signal, and centering such sampling pulse on the received signal waveform at a centering position where the mineral soil signal component is of minimum amplitude. As a result, equal positive and negative polarity portions of the mineral soil signal component on opposite sides of the centering position, are transmitted through the gate means for each gating pulse to an averaging means where they are averaged to zero. The noise signal component also averages to zero in the averaging means which has an RC time constant about fifty times greater than the width of the gating pulse. This improved noise rejection is also possible when the metal detector is operated in a discriminate mode to discriminate the hunted object from undesired metal objects of the same type which produce a background signal component in the received signal, such background signal component also being sampled or gated at a position of minimum amplitude.

In addition, a metal detector of the present invention is provided with greater sensitivity and greater signal-to-noise ratio by employing balanced demodulation in the gating circuit. This balanced demodulation technique averages the gated portion of the received signal during one half cycle and averages the other one-half cycle portion of the received signal after inverting it in order to produce a higher average output voltage corresponding to the detected signal of the buried metal object.

SUMMARY OF THE INVENTION

It is one object of the present invention to provide an improved metal detector which gates the received signal to eliminate the mineral soil signal component of the received signal or to discriminate between a desired metal object and undesired metal objects.

Another object of the invention is to provide such a metal detector which has greater noise rejection.

A further object of the present invention is to provide such a metal detector of greater sensitivity and greater signal-to-noise ratio.

Still another object of the present invention is to provide such a metal detector with wide gating pulses which are centered on the received signal waveform at a centering position where the background signal component produced by mineral soil or undesired metal objects is of minimum amplitude to produce a gated received signal, and averaging the gated portion of the received signal.

A still further object of the present invention is to provide such a metal detector employing balanced demodulation in which the gated $\frac{1}{2}$ cycle portion of the received signal and the other $\frac{1}{2}$ cycle portion of the received signal are both averaged to produce the output voltage corresponding to the detected signal of the metal object.

BRIEF DESCRIPTION OF THE DRAWINGS

Other objects and advantages of the present invention will be apparent from the following detailed description of a preferred embodiment thereof and from the attached drawings, of which:

FIG. 1 is a block diagram of a preferred embodiment of the metal detector of the present invention;

FIG. 2 is an electrical circuit diagram of the gate circuit and gating pulse generator employed in the block diagram of FIG. 1; and FIG. 3 shows electrical signal waveforms produced in the circuits of FIGS. 1 and 2.

DESCRIPTION OF PREFERRED EMBODIMENT

As shown in FIG. 1, one embodiment of the transmit-receive type metal detector of the present invention includes a transmit oscillator 10 connected to a transmit coil 12 to apply an audio frequency oscillator signal to such transmit coil. Preferably, such oscillator signal is a sine wave signal having a frequency of about 5,000 hertz, one specific example being a 5,130 hertz signal. A receive coil 14 is positioned adjacent the transmit coil, and both are contained within a search head 16 which may be a sealed waterproof housing made of synthetic plastic material. The transmit and receive coils are positioned so that an external electromagnetic field produced by the transmit coil as a result of the oscillator signal flowing therethrough, causes a received signal to be induced in the receive coil 14 by a metal object external to the search head when such metal object is detected by the electromagnetic field of the transmit coil. A magnetic metal object produces the received signal by distorting the field of the transmit coil. However, a nonmagnetic metal object produces the received signal by radiating another field due to the eddy currents induced in such object. In either case the received signal is produced while the oscillator signal is being transmitted through the transmit coil. The transmit-receive metal detector of the present invention is a buried metal detector which operates by gating the received signal in a similar manner to that of the sampling metal detector of U.S. Pat. No. 4,030,026, whose disclosure is hereby incorporated by reference. The transmit and receive coils are supported so that their inductances are balanced and such coils may be interconnected by appropriate nulling circuitry (not shown) so that substantially no received signal is induced in the receive coil 14 by an oscillator signal flowing through the transmit coil when the search head is located in air and no metal objects are present.

The output of the receive coil 14 is connected to a preamplifier 18 whose output stage includes a transistor 20 connected to a phase shift circuit 22 at the input of a gate circuit 24. A gating pulse generator 26 having its input connected to the output of oscillator 10, produces gating pulses at its ouput in response to the receipt of the transmit oscillator signal. These gating pulses are applied to gate terminal 28 of gate circuit 24 in order to render a gate means in such gate circuit conducting for a time period determined by the width of the gating pulses. The operation of the gate circuit 24 is hereafter described with reference to FIG. 2.

The output of the gate circuit is applied to the input of a D.C. amplifier and tuner 30, such output being a D.C. voltage corresponding to a gated portion of the received signal produced by the detected metal object. The output of the D.C. amplifier and tuner 30 is connected to the input of an audio modulator 32 and is modulated by an audio frequency signal supplied by a frequency divider circuit 24 connected to the oscillator 10, such frequency divider dividing the oscillator frequency by a factor of 8. As a result, the D.C. output voltage of the gate circuit 24 is amplitude modulated by the audio modulating signal supplied by the frequency divider 34 to produce a modulated signal which is transmitted through an audio amplifier 36 to an indicator device 38. The indicator device may be a loudspeaker or an ammeter, which indicate the presence of a detected metal object either by a sound signal or by a visual meter reading.

The phase shift circuit 22 includes two variable resistors 40 and 42 of about 30 kilohms each which are connected respectively at their input terminals to the collector and emitter of transistor 20. Transistor 20 is an NPN type transistor, having its base connected to the output of preamplifier 18. Transistor 20 serves as the output stage of the preamplifier and has its collector connected to a source of positive D.C. supply voltage through a load resistor 44 of about 2.2 kilohms, while the emitter of such transistor is connected to ground through an emitter resistor 46 of the same value. The output terminal of resistor 40 is connected to the DISCRIMINATE terminal 48 labeled "DISC" of a two-position selector switch whose GROUND EXCLUSION BALANCE terminal 50 labeled "GEB" is connected to the output of resistor 42. A movable contact 52 of the switch selectively connects terminals 48 and 50 to the input of the gate circuit 24 to provide operation in the discriminate mode or in the ground exclusion balance mode for switch positions 48 and 50, respectively. A capacitor 54 of 0.001 microfarads is connected from the input terminal of resistor 40 to the output terminal of resistor 42 while a different capacitor 56 of 0.015 microfarads is connected from the input terminal of resistor 42 to the output terminal of resistor 40. As a result of the different values of the capacitors, the variable resistors 40 and 42 phase shift the received signal by different amounts. In the GEB position 50 of switch 52, resistor 42 phase shifts the received signal relative to the gating pulses produced by the gating pulse generator so that such gating pulses are centered on the received signal waveform at a centering position where a mineral soil signal component of such received signal is of minimum amplitude. This is indicated by the indicator device 38 producing no sound or a zero meter reading when the search head 16 is positioned over mineral soil alone.

As shown in FIG. 3, a received signal 58 produced by a detected metal object and transmitted from the receive coil 14 to the output of the preamplifier 18, consists of a resistive signal component 60 labeled "R" and a reactive signal component 62 labeled "X" 90° out of phase with respect to the resistive component. This received signal is phase shifted an angle $\theta$ by variable resistor 42 in the GEB position 50 of switch 52 to provide a phase shifted received signal 58' which is comprised of phase shifted resistance component 60' and phase shifted reactive component 62'. Thus, the phase shifted reactive component 62' leads the non-phase shifted reactive component 62 by an angle $\theta$ as a result of the phase shift provided by variable resistor 42. This causes the zero axis crossover at point 68 of the phase shifted reactive component 62' to occur in the center of each pulse of a plurality of gating pulses 64 produced by the gating pulse generator 26 in response to the receipt of the transmit oscillator signal 66 of oscillator 10. It has been found that the mineral soil signal component of the received signal is in phase with the reactive component 62 so that the minimum amplitude portion of such mineral soil signal component corresponds to the zero axis crossover 68 of the phase shifted reactive component 62'.

As shown in FIG. 3, the gated portion of the phase shifted reactive component 62' corresponding to the mineral soil signal, includes a positive signal portion 70 and a negative signal portion 72 of opposite polarity on opposite sides of the zero crossover point 68 corresponding to the centering position of minimum amplitude of the mineral soil signal. However, since these positive and negative signal portions 70 and 72 are equal in amplitude and opposite in polarity, they cancel each other and average to zero in the gating circuit 24. As a result, the mineral soil signal component of the received signal is eliminated from the averaged output voltage produced at the output of the gate circuit 24. The negative half cycle of the phase shifted resistive component 60' is transmitted through the gate means during the gating pulse 64 as a gated portion 74 of the R signal. This gated portion of the R signal is integrated or averaged to produce a negative D.C. output voltage at the output of the gate circuit which corresponds to the detected signal of the metal object. It may be desirable to move the gating pulses 64 180° from the position shown in FIG. 3 so that the gated portion of the R signal would be positive, giving a positive average D.C. voltage output 108.

FIG. 2 shows the electrical circuit of the gate circuit 24 and gating pulse generator 26. The gate circuit includes a gate means 76 which may be a PN junction field effect transistor. The gate electrode of transistor 76 is connected to the gate terminal 28 of the gate circuit, while its source electrode is coupled to the input terminal 78 of the gate circuit and its drain electrode is coupled to the output terminal 80 of such gate circuit. The gating pulse generator 24 includes a switching transistor 82 which is normally biased nonconducting. The switching transistor has its base connected through a coupling resistor 84 of about 100 kilohms to the input 85 of the pulse generator which is connected to the output of the oscillator 10. The base of transistor 82 is also connected to a source of positive D.C. supply voltage through a bias resistor 86 of about 750 kilohms. The emitter of the switching transistor 82 is grounded, and its collector is connected to the base of the gating transistor 72. A load resistor 88 of about 100 kilohms is connected between the collector of switching transistor 82 and the source of gating transistor 76. When the sine wave oscillator signal 66 applied to the base of switching transistor 82 goes positive, crossing the zero axis sufficiently to forward bias its emitter junction by 0.7 volts, such transistor switches from a nonconducting state to a conducting state to produce the leading edge of the gating pulse 64. The switching transistor 82 is rendered nonconducting when the oscillator signal 66 goes negative crossing the zero axis, thereby producing the trailing edge of the gating pulse. Thus, in the preferred embodiment of the present invention the gating pulse 64 has a pulse width approximately equal to one half cycle of the transmit oscillator signal 66. The voltage of these positive going gating pulses switches from zero to a positive voltage greater than the pinch-off voltage of the field effect transistor used for gating transistor 76, which is typically 1 to 4 volts. The gating pulses are always of sufficient amplitude to switch the same gate transistors 76 from its normal quiescent nonconducting state to a conducting state, and thereby cause a gated portion of the received signal to be transmitted from the source to the drain through such gate transistor for a time period corresponding to the width of the gating pulse.

The gate circuit 24 contains an integration or averaging circuit providing a noise reduction means including a first operational amplifier 90 having its inverting input connected through a coupling resistor 92 of 510 kilohms to the drain output of the gating transistor 76. A first negative feedback resistor 94 of one megohm is connected from the output of amplifier 90 to its inverting input. The non-inverting input of amplifier 90 is connected to a source of positive D.C. reference voltage. An averaging capacitor 96 of 0.0047 microfarads is connected in parallel with feedback resistor 92 and functions to integrate or average the gated portion of the received signal transmitted through gate means 76. It should be noted that the RC time constant for charging capacitor 96 through resistor 94 is about 0.0047 second, whereas the pulse width of the gating pulse 64 is about 0.000097 second when the oscillator signal has a frequency of 5130 hertz. Thus, the RC time constant for charging the capacitor 96 is about 50 times the width of the gating pulse to enable averaging of the gated received signal. Since the ratio of the feedback resistor 94 to the input coupling resistor 92 is approximately two to one, the gain of the operational amplifier 90 is about −2, for signals flowing through the coupling resistor 92.

A second operational amplifier 98 is provided in the gating circuit 24 with its output connected to the source of the gating transistor 76 and its inverting input connected through a coupling resistor 100 of 100 kilohms and a coupling capacitor 102 of 0.01 microfarads to the input terminal 78 of the gating circuit. A negative feedback resistor 104 of 100 kilohms is connected between the output and the inverting input of amplifier 98. Since this feedback resistor 104 is equal in resistance to the coupling resistor 102, the gain of operational amplifier 98 is −1. Thus, the gated portion of the received signal which is transmitted through a first signal path including amplifier 98, gating transistor 76 and amplifier 92 has a gain of −1 times −2, equal to +2.

A second signal path is provided for the received signal from input 78 through a shunt resistor 106 of 1 megohm around amplifier 98 and gate transistor 76 to the inverting input of operational amplifier 90. Since shunt resistor 106 is equal in resistance to the feedback resistor 94, the operational amplifier 90 has a gain of −1 for that portion of the received signal transmitted through such shunt resistor along such second signal path. The portion of the received signal transmitted through the second signal path provided by shunt resistor 106 is added to the gated portion of the received signal transmitted through the first signal path of amplifier 98 and gate 76 at the inverting input of amplifier 90. As a result, the final output signal at the output of the amplifier 90 when gate 76 is conducting is the sum of a received signal portion having a gain of −1 for the second signal path plus a gated received signal portion having a gain of +2 for the first signal path, such output signal having a total overall gain of 2−1=+1 at output 80.

Because of this total gain of +1 during gating, the positive and negative portions 70 and 72 of the gated X signal at the output 80 before averaging are of the same polarity as the phase shifted reactive signal component 62′, as shown in FIG. 3. Similarly, the gated portion 74 of the R signal is of the same polarity as the phase shifted resistive signal component 60′.

However, when the gating transistor 76 is non-conducting, the received signal is only transmitted through the second signal path including resistor 106 and amplifier 90 to the output terminal 80 with a gain of −1. Therefore, the negative portion 72 and the positive portion 70 of the half cycle of the phase shifted reactive signal 62′ which occurs between the gating pulses 64 are phase inverted to appear as positive polarity portion 72′ and negative polarity portion 70′, as shown by dashed lines in FIG. 3. Since the inverted positive and negative portions 70′ and 72′ are of equal amplitude and opposite polarity, they cancel or average to zero in the averaging capacitor 96. Thus, the total average voltage of the gated reactive signal and the portion of the reactive signal transmitted through resistor 106 when the gate is nonconducting, is zero and makes no change in the D.C. output voltage on the averaging capacitor 96.

When the phase shifted resistive component 60′ of positive polarity occurring between the gating pulses 64 passes through the second signal path including resistor 106 and amplifier 90 with a gain of −1, it is inverted to a negative R signal portion 107, as shown by dashed lines in FIG. 3. The average voltage of the inverted negative signal 107 of the R component is added to the average voltage of the gated non-inverted negative R signal 74 to provide an average D.C. output voltage 108 at the output 80 of the gate circuit which is equal to about 0.636 of the peak voltage of the half cycle sine waves of signals 74 and 107. This is about 6 db greater than the average of the gated signal portions 74 alone. As a result of this increase in the average voltage 108, the metal detector of the present invention has greater sensitivity and a higher signal-to-noise ratio. Thus, it will be apparent from the above that the preferred embodiment of the gate circuit of the present invention is a balanced demodulator which transmits the received signal to the output 80 of the gate circuit 24 during both half cycles of the received signal. However, it should be noted that a half cycle unbalanced demodulator can be employed by eliminating the second signal path through resistor 106 so that the X signal portions 72' and 70' and R signal portion 107 would not be averaged to form part of the output voltage. Thus, this would be inefficient since the average D.C. output voltage 108 of such an unbalanced demodulator would be reduced to approximately one half the amount produced by the balance demodulator.

By employing a wide gating pulse 64 having a pulse width greater than about $\frac{1}{3}$ cycle and preferably approximately equal to $\frac{1}{2}$ cycle of the transmit oscillator signal, the metal detector of the present invention reduces noise greatly. Random noise of high frequency averages to zero because such random noise is of much higher frequency than the oscillator signal. Thus, most random noise of concern in metal detectors has a period of about 0.1 to 1.0 microsecond so that many cycles of such random noise occur during the wide gating pulse. While maximum reduction of random noise occurs with infinitely wide gating pulses, it has been found that most of the potential reduction has already occurred at pulse widths of about $\frac{1}{3}$ cycle of the transmit oscillator signal.

In addition, harmonic noise which is a harmonic of an external signal source, such as the 60 hertz signal radiated by power lines in most search locations and is close to the transmit oscillator frequency or a harmonic thereof, is greatly reduced. Harmonic noise near the second and third harmonics of the oscillator signal is the greatest problem. For example, using an audio oscillator frequency of 5125 hertz, the second harmonic of such oscillator signal is 10,250 hertz. This is close to the 171st harmonic of the 60 hertz signal of the power lines having a frequency of 10,260 hertz. Such second harmonic noise and all even harmonics are completely eliminated when employing a gating pulse 64 having a pulse width equal to $\frac{1}{2}$ cycle of the transmit oscillator signal. Likewise, the harmonic of 60 hertz closest to the 15,375 hertz third harmonic of the oscillator signal is the 256th harmonic of 60 hertz having a frequency of 15,360 hertz. This third harmonic is completely eliminated by makng the gating pulse width equal to $\frac{1}{3}$ cycle of the transmit oscillator signal but is only partially rejected by a pulse width of $\frac{1}{2}$ cycle. Thus, the $\frac{1}{2}$ cycle pulse width reduces the third harmonic by an amount equal to 9.6 db or 33% of its initial amplitude. While the second and third harmonics of the oscillator are the worst harmonic noise problem, the second harmonic is by far the most troublesome, since it has a much higher amplitude which in some cases may be over ten times the third harmonic. For this reason, in most cases it is preferable to make the pulse width of the gating pulse equal to approximately $\frac{1}{2}$ cycle of the transmit oscillator signal. However, there may be other sources of harmonic noise than the 60 hertz power lines, such as electrical motor driven tools. Therefore, the gating pulse may be somewhat wider or narrower than $\frac{1}{2}$ cycle and should have a pulse width of at least about $\frac{1}{3}$ cycle of the transmit oscillator signal for best results in noise reduction.

It should be noted that the shunt resistor 106 makes the gate circuit a balanced demodulator and together with the averaging capacitor 96 and feedback resistor 94 provides a low pass filter, both of which together reduce any low frequency subharmonic noise in the output voltage which is below the transmit oscillator frequency.

The discriminate mode of operation is similar to the above-described operation in the GEB mode. However, the background signal component produced by undesired metal objects is eliminated by gating, rather than eliminating the mineral soil signal component. In the discrimination mode the X signal component 62 corresponds to the background signal component of the undesired metal objects of the same type, such as can pull tabs or bottle caps or chewing gum wrappers. Thus, the gated portion background signal component corresponding to the undesired metal object transmitted through gate 76 will have positive and negative portions of equal amplitude and opposite polarity positioned on opposite sides of the zero axis crossover point, like portions 70 and 72 in FIG. 3. For this reason, the positive and negative portions of the gated background signal will cancel and average to zero in the averaging capacitor 96, thereby eliminating the background signal component from the output voltage produced at output 80. It should be noted that the metal detector of the present invention cannot eliminate both the mineral soil signal component and the background signal component of an undesired object at the same time. Therefore, the phase shift resistors 40, 42 are selectively connected by switch 52 to the gate circuit at different times.

It will be obvious to those having ordinary skill in the art that many changes may be made in the details of the above described preferred embodiment of the present invention without departing from the spirit of the invention. Therefore, the scope of the present invention should only be determined by the following claims.

I claim:

1. A metal detector circuit comprising:

transmit coil means;

receive coil means;

search head means for enclosing and supporting said transmit coil means and said receive coil means in such a manner as to enable the detection of metal objects in an unobservable position external to the search head;

oscillator means coupled to said transmit coil means for transmitting an oscillator signal through said transmit coil and causing a received signal to be induced in said receive coil means during the transmission of said oscillator signal when a metal object is present thereby enabling the detection of said metal object, said received signal including a background signal component when said metal object is located in a background containing mineralized soil or undesired objects;

gating pulse generator means for producing gating pulses related in time to the oscillator signal, said gating pulses having a pulse width of at least about one third of one cycle of said oscillator signal;

a gate circuit coupled to the output of said pulse generator and having its input coupled to the output of said receive coil means, including gate means for gating a portion of said received signal through said gate means during the transmission of said oscillator signal when it is rendered conducting for a time period corresponding to the width of the gating pulse to produce an output signal corresponding to the gated portion of said received signal;

phase adjustment means coupled to the gate circuit for moving the gating pulses and received signal relative to each other to center said gating pulses at a centering position on the received signal waveform where the background signal component of said received signal is of minimum amplitude, and for causing substantially equal positive and negative polarity portions of the background signal component on opposite sides of said centering position to pass through said gate means during the gating pulse; and noise reduction means for reducing noise, including random noise of high frequency and 60 hertz noise signals and harmonics thereof, in said output signal including an inverter amplifier having an inverting input connected to the output of said gate means and an averaging capacitor connected in a negative feedback path between the output of said inverter amplifier and said inverting input to cause said positive and negative portions to cancel and produce substantially no change in the output signal.

2. A metal detector circuit in accordance with claim 1 in which the centering position of minimum amplitude corresponds to the point where the reactive component of the received signal crosses the zero axis of said received signal.

3. A metal detector circuit in accordance with claim 1 in which the oscillator signal is a sine wave of audio frequency.

4. A metal detector circuit in accordance with claim 1 in which the gating pulses have a pulse width approximately equal to ½ cycle of said oscillator signal.

5. A metal detector circuit in accordance with claim 1 in which the gating pulses have a faster rise time than the oscillator signal.

6. A metal detector circuit in accordance with claim 1 in which the noise reduction means also averages the amplitude of received signal after inverting during the portion of the cycle of the received signal which is not transmitted through the gate means, to produce said output voltage.

7. A metal detector circuit in accordance with claim 1 in which the inverter amplifier has a feedback resistance connected in parallel with said averaging capacitor and its inverting input is connected to the output of said gate means through a coupling resistance to provide a first operational amplifier.

8. A metal detector circuit in accordance with claim 7 which includes a second operational amplifier having its output connected to the input of the gate means, said second operational amplifier having a gain of −1, a shunt resistor connected from the input of the second operational amplifier to the input of said first operational amplifier, and a feedback resistor connected in parallel with said capacitor and having a resistance substantially equal to said shunt resistor to provide said first operational amplifier with a gain of −1 when the gate means is nonconducting.

9. A metal detector circuit in accordance with claim 8 in which said coupling resistance is approximately equal to one-half of said feedback resistance to provide said first operational amplifier with a gain of −2 through said coupling resistance when said gate means is conducting, so that the gain for the gated portion of the received signal passing through the first and second operational amplifiers and the gate is +2 and the gain for the portion of the received signal passing through the shunt resistor and the first operational amplifier is −1 which are added, giving a total gain of +1 for the received signal when the gate means is conducting.

10. A metal detector circuit with improved noise reduction comprising:

transmit coil means;

receive coil means;

search head means for enclosing and supporting said transmit and receive coil means to enable the detection of buried metal objects external to the search head;

oscillator means coupled to the transmit coil means for transmitting an oscillator signal of audio frequency through said transmit coil and causing a received signal to be induced in said receive coil during the transmission of said oscillator signal when a buried metal object is present thereby enabling the detection of said metal object, said received signal including a background signal component when said metal object is located in a background containing mineral soil or undesired objects of the same type;

gating pulse generator means for producing gating pulses having a pulse width approximately equal to one-half of one cycle of said oscillator signal at a time related to said oscillator signal;

a gate circuit connected to the output of said pulse generator and having its input connected to the output of said receive coil, including gate means for gating a portion of the received signal through said gate means when it is rendered conducting for a time period corresponding to the width of the gating pulse to produce an output voltage corresponding to said gated portion of the received signal;

phase shift means for adjusting the phase of the gating pulses and the received signal relative to each other to center said gating pulses at a centering position on the received signal where the background signal component of the received signal is of minimum amplitude, and for causing substantially equal positive and negative polarity portions of the background signal component on opposite sides of said centering position to pass through said gate means during the gating pulse; and noise reduction means for reducing noise, including random noise of high frequency and 60 hertz noise signals and harmonics thereof, in said output voltage and connected to the output of said gate means to cause said positive and negative portions to cancel, said noise reduction means including an inverter amplifier having an inverting input connected to the output of said gate means and an averaging capacitor connected in a negative feedback path between the output of said inverter amplifier and said inverting input so that any random frequency noise component of said gated portion of the received signal averages to zero in said averaging capacitor to produce substantially no change in the output voltage.

11. A metal detector circuit in accordance with claim 10 in which the inverter amplifier has its inverting input connected through a first coupling resistor to the output of the gate means, and first negative feedback resistor connected in parallel with said averaging capacitor to provide a first operational amplifier.

12. A metal detector circuit in accordance with claim 11 in which the gate circuit includes a second operational amplifier coupled between the receive coil means and the input of the gate means, and a shunt resistor connected between the inverting input of said second amplifier and the inverting input of the second amplifier.

13. A metal detector circuit in accordance with claim 12 in which the gate means is a field effect transistor having a source terminal input, a drain terminal output and a gate terminal connected to the gating pulse generator.

14. A metal detector circuit in accordance with claim 12 in which a second coupling resistor is connected to the inverting input of the second amplifier and a second negative feedback resistor is connected between the output and the inverting input of said second amplifier, said second coupling resistor and said second feedback resistor being of the same resistance to provide the second operational amplifier with a gain of $-1$.

15. A metal detector circuit in accordance with claim 14 in which the shunt resistor is equal to the resistance of the first feedback resistor to provide the first operational amplifier with a gain of $-1$ for the received signal transmitted through the shunt resistor, and the first coupling resistor being about one-half the resistance of the first feedback resistor to provide the first operational amplifier with a gain of $-2$ for the gated portion of the received signal transmitted through said first coupling resistor, said gated portion of the received signal being amplified by said first amplifier and said second amplifier for a total gain of $+2$ and added to the portion of the received signal transmitted through the shunt resistor and amplified by the first amplifier with a gain $-1$, thereby providing a received signal output signal at the output of the first amplifier whose gain is $+1$ when the gate means is rendered conducting and whose gain is $-1$ when the gate means is nonconducting.

16. A metal detector circuit in accordance with claim 10 in which the phase shift means includes a first phase shift means for centering the gating pulses on the centering position of a received signal component produced by mineral soil to eliminate the mineral soil signal component, a second phase shift means for centering the gating pulses on the centering position of a received signal component produced by undesired metal objects to discriminate from said undesired objects, and switch means for selectively operating said first and second phase shift means.

17. A metal detector circuit in accordance with claim 10 in which the gating pulse generator switches when an input signal corresponding to the oscillator signal crosses its zero axis to produce the gating pulses, said gating pulses having a leading edge produced when the input signal of the pulse generator crosses the axis in one direction and a trailing edge produced when said input signal crosses said axis in the opposite direction.

18. A metal detector circuit in accordance with claim 10 in which the centering position of minimum amplitude corresponds to the point where the background signal component crosses the zero axis of the received signal.

* * * * *